United States Patent [19]

Bramblet

[11] Patent Number: 4,822,000
[45] Date of Patent: Apr. 18, 1989

[54] ECCENTRIC SEGMENTED BALL VALVES
[75] Inventor: John W. Bramblet, Houston, Tex.
[73] Assignee: Rockford Controls Corporation, Houston, Tex.
[21] Appl. No.: 88,576
[22] Filed: Aug. 24, 1987
[51] Int. Cl.[4] .............................................. F16K 1/16
[52] U.S. Cl. ................................... 251/298; 251/180; 251/359
[58] Field of Search .............. 251/163, 298, 304, 334, 251/332, 314, 180, 359, 315

[56] References Cited

U.S. PATENT DOCUMENTS

| | | | |
|---|---|---|---|
| 3,131,906 | 5/1964 | King | 251/332 X |
| 3,191,906 | 6/1965 | Zeigler et al. | 251/304 X |
| 3,301,523 | 1/1967 | Lowrey | 251/332 X |
| 3,379,408 | 4/1968 | Lowrey | 251/298 |

Primary Examiner—A. Michael Chambers
Assistant Examiner—John C. Fox

[57] ABSTRACT

A segmented ball valve has a rotatably mounted segmented ball valve element positioned to rotate eccentrically in a valve body with respect to three valve body sealing elements about the sealing opening for the valve body. The sealing elements include a compression seal of a flexible sealing element operative at one angular closure position of the ball valve element, a metal-to-metal seal with a flexible metal element operative in a second angular closure position and a metal-to-metal compression seal operative in a third angular closure position.

11 Claims, 3 Drawing Sheets

ECCENTRIC SEGMENTED BALL VALVES

FIELD OF THE INVENTION

This invention relates to segmented ball valves and more particularly to an improved segmented ball valve and seating arrangement for providing a fluid tight sealing system in a segmented ball valve for use as a shut-off valve.

BACKGROUND

The technology of segmented ball valves is well developed. Typically, a segmented ball valve includes a hollow valve body which has a throughput or flow passageway and has attached thereto, flange members for coupling to a pipe or conduit. In the valve body, a rotatable segmented ball valve element is rotatably mounted to move between a position closing the passageway to fluid flow and a position permitting full bore fluid flow through the passageway. The segmented ball valve element is rotatively mounted by virtue of a lower rotative pinion mounting of the valve element to the valve body and an upper rotatable shaft mounting which extends to the exterior of the valve body so that rotative motion can be imparted to the shaft by a wrench or the like.

While there are a variety of specific valve applications and varieties of valves, it is highly common that the valve element seal against an annular elastomer and/or teflon or resilient sealing member and/or some sort of metal-to-metal contact seal. When the valve element is in a closed position, substantial pressure differential can exist across the sealing surface of the valve element and the sealing member.

While the prior art has suggested use of eccentric pinions and shafts for the mounting of valve members, it has not heretofore utilized eccentric mounting of the pinion and shaft for a segmented ball valve member in connection with a sealing system wherein three (3) distinct gradients of sealing can be accomplished with the sealing mechanism as a function of the turning torque on the valve element.

THE PRESENT INVENTION

The present invention obtains several advantages not heretofore obtainable with segmented ball valves. For example, in the conventional segmented ball valve, once the valve member is rotated to the closed position, the sealing effect is as good as it will ever be. With the present invention, the sealing effect can be increased as a function of rotational torque.

The present invention contemplates a valve body having a throughput passageway disposed about a central, longitudinal extending passageway axis. In the valve body is an inwardly facing annular sealing means disposed about the central passageway axis. A segmented ball valve element is rotatably mounted by a pinion and turning shaft for rotation about a first transverse pivot axis which is perpendicular to the passageway axis. The segmented ball valve element has an annular sealing surface disposed about a longitudinally extending valve sealing axis. When the segmented ball valve element is in a fully sealed relationship relative to the annular sealing means in the valve body, the valve sealing axis is co-extensive with the passageway axis and the pivot axis is in a plane perpendicular to the valve sealing axis.

In a fully sealed position of the valve element three (3) sealing mechanisms are provided which include (1) a compressive seal of a resilient sealing element, (2) a metal-to-metal seal with a resilient metal element, and (3) a metal-to-metal seal under compression between metallic elements.

The valve element is arranged to cooperate with the annular sealing surface in the valve body within a very small angle of rotative movement of the valve element. Thus the valve element is rotated through, say, 82° or rotation between an open to a closed position before sealing contact begins to occur with the sealing element on the valve body. The first sealing contact is with an elastomer or elastic sealing element on the valve body and the valve element. If satisfactory to stop fluid flow, the valve element need not be rotated through a full 90° turn. If the resilient sealing element is inadequate to stop fluid flow a further rotative angular turn of the valve element to 86° will cause a resilient metal to metal sealing contact to occur by virtue of a resilient metal sealing surface engaging the valve element. In the event this sealing is adequate to stop fluid flow, no further rotative movement need be made. In the event, however, the valve is still not closed tight enough, an additional 4° of angular rotation to a 90° position of the valve element will cause the valve element to compress metal to metal with respect to the sealing means to produce a tight shut off sealing of the valve.

It will be appreciated that in terms of function the valve element herein described is a segmented ball valve which has the functional characteristics of a plug valve in that the sealing relationship may be increased by increasing the rotative torque or turning motion on the valve element which is a function not heretofore obtained by rotative segmented ball valve devices.

THE DRAWINGS

DESCRIPTION OF THE PRESENT INVENTION

Figure 1:
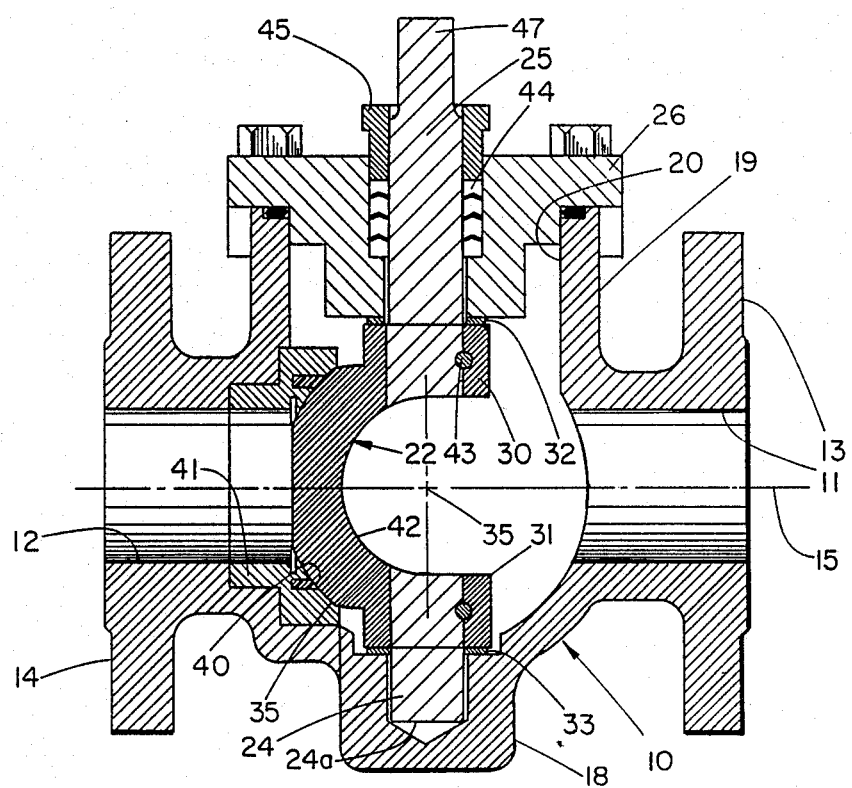
FIG. 1 illustrates in cross-section a valve construction according to the present invention.

Referring now to the drawings, in FIG. 1 a hollow valve body member 10 is illustrated which has a generally annular construction with cylindrically shaped inlet and outlet passages or bores 11, 12 and circularly shaped end flange members 13, 14 for coupling to pipes or conduits. The annular valve body member 10 is elongated and disposed along a passageway axis 15 so that the axis 15 is the central axis for a throughput passage at least the size of a bore 11 or 12. The valve body member 10 is elongated in a direction perpendicular to the axis 15 to provide a lower pinion housing section 18 and an upper shaft housing 19. The upper shaft housing 19 terminates at an open annular bore 20 so that a segmented ball valve member 22 can be inserted through the bore 20 and into the valve body. The valve member 22 has a lower circularly shaped pinion or shaft 24 which is rotatively received in a pinion bore 24a and an upper circularly shaped shaft 25 extending through a valve head member 26 where the valve head member 26 is sealingly attached to the valve body 10 and permits the upper shaft member 25 to extend outwardly of the valve head member 26.

As illustrated in the drawing, the valve member 22 has an upper and lower circularly shaped connecting sections 30, 31 which are spaced from the valve body member 10 by thrust bearings or spacer members 32, 33. The segmented ball valve member 22 includes a generally C-shaped portion in vertical cross-section and has a truncated or triangular shaped section in horizontal cross-section at its midpoint. (See FIG. 3). Thus, the valve member is shaped between the circular top and bottom sections at a midpoint triangular section with a generally C-shaped section in vertical cross-section. The segmented ball valve member 22 has an outer spherically shaped ball shaped sealing surface 35 which is disposed about a central radius point 36. In a fully closed position of the valve member 22, the radius point 36 is disposed on the central axis 15 of the passageway. As shown in the closed position in FIG. 1, the sealing surface 35 on the ball valve member 22 engages one or more annular sealing surfaces 40 in an annular sealing insert 41 in the valve body 10.

Figure 3:
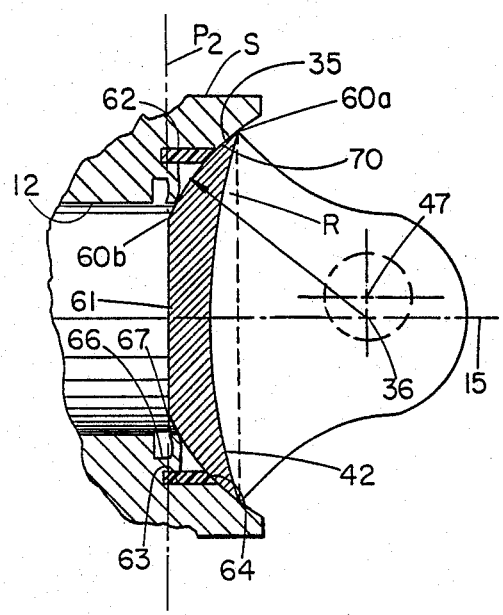
FIG. 3 illustrates in cross-section a valve element in sealed relationship to a sealing means for a closed position of a valve.

In the valve construction illustrated in FIG. 1, the valve member 22 is inserted from the top of the valve body through the upper bore 20 in the valve body. The valve member 22 is connected to the upper shaft member 25 and to the lower shaft member 24 so that a central valve section 42, the shaft member 25 and the shaft member 24 form a three piece construction. The valve section 42 has bores to slidingly receive the shaft members 24 and 25 and transverse pins 43 interconnect the shaft members to the valve section 42. The upper shaft member 25 is rotatively and sealingly received in a sealing bore 44 and retained by a retainer nut 45. The valve member 22 is rotatable about a vertical shaft axis 47 which extends through the shafts 24 and 25 to a fully open position permitting throughput flow through the passageway. As shown in FIG. 3, in a closed position of the valve element 22, the shaft axis 47 is offset to one side of the axis 15.

Figure 2:
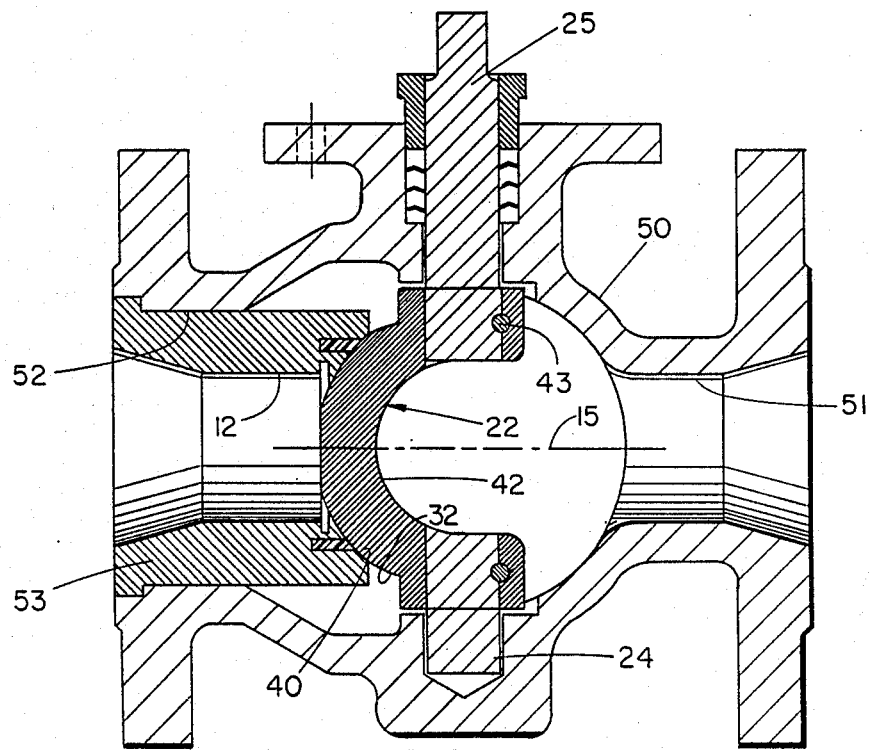
FIG. 2 illustrates in cross-section, a different form of valve construction which utilizes the present invention.

Referring now to FIG. 2, a valve is illustrated similar to the valve of FIG. 1, however, the valve body 50 of FIG. 2 has a reduced diameter port 51 and the ball valve element 22 is required to be united and assembled through an enlarged diameter bore 52. As shown in FIG. 2, when the annular sleeve member 53 is removed from the bore 52 the ball section 42 can be inserted into the valve body 50, the shaft 24 inserted and pin connected and the upper shaft 25 inserted and pin connected by pin 43. Thus, the three piece construction facilitates assembly of the ball valve member 22 in the valve body 50 through an end flange bore 52 in the valve body. The sleeve member 53 carries the sealing surfaces 40 and thus in the event of wear, the sleeve member 53 and sealing surfaces 40 can easily be replaced from the end of the valve body 50.

Referring to FIGS. 1-4, a valve section 42 is generally C shaped in vertical cross-section and has a spherically shaped sealing surface 35 disposed at a radius R from a locus point 36 (FIG. 3). The sealing surface 35 is only partial and is located between two parallel planes $P_1$ and $P_2$ which are perpendicular to the axis 15. A top or end surface 61 is on the plane $P_2$ and perpendicular to the axis 15 for a bore 12 when the valve element 42 is in the closed position shown. The spherical surface 35 extends between circular edges 60a and 60b with the circular edge 60b defining the flat surface 61. The distance "Y" from an outer spherical surface plane to the flat surface 61 or the amount of truncation is defined by the following equation:

$$Y = 0.007X^2 - 0.02X + 0.170$$

where X is the ball diameter. This is an empirical equation which defines the minimum amount of material between edges 60a and 60b to maintain support contact with the seal during opening of the valve.

Disposed about the spherical surface 60 is a first annular sealing element 62 which is constructed of teflon or like material for a resilient or soft sealing function. The sealing element 62 is trapezoidal in cross-section being disposed in an annular groove 63 in a seat S which can be an insert 41 or 53. The sealing element 62 has a forward or angular inclined surface 64 for engaging the spherical surface 35. As will become apparent hereafter, the seating element 62 will sealingly engage the spherical surface 35 when the valve section 42 is at an angular rotational position of 82° with respect to a rotational position of 0° being a fully open rotational position of a valve element 22.

A valve element insert 41 or 53 is provided with an annular groove 66 in a bore 12 to define an annular ring 67 which forms a flexible metal sealing element. The thickness of the sealing element 67 and the depth of the groove 66 is such that the application of force by the spherical surface 35 produces a flexture or bending of the sealing element 67 and thus a flexible metal-to-metal seal. The valve element insert 41 or 53 has a forward spherically shaped sealing surface 70 about the locus point 36 where the surface 70 is adapted for complimentary engagement with the spherical surface 35 so that the spherical surface 35 can apply a compression sealing force to the sealing surface 70.

Figure 4:
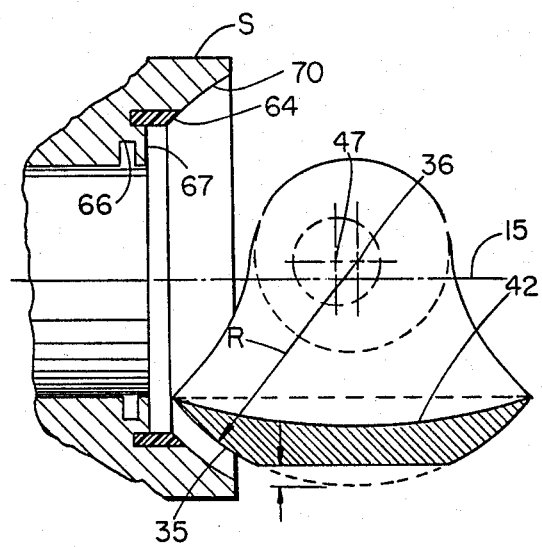
FIG. 4 illustrates in cross-section the valve structure of FIG. 3 with the valve element rotated to an open position.

As shown in FIG. 4, when the valve element 42 is rotated about the trunion or shaft axis 47, the spherical surface 35 is rotated away from the sealing elements 67, 64, 70 to a full open position with respect to the bore axis 15 and through passage of the valve body.

Figure 5:
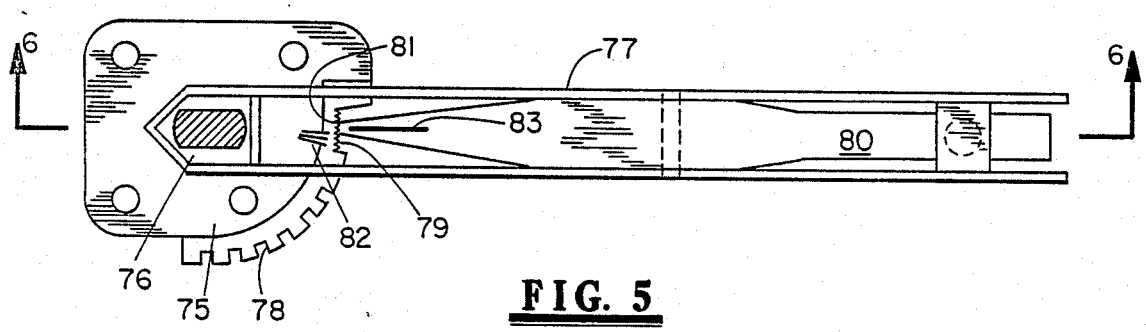
FIG. 5 illustrates in plane view a valve handle for operating a valve element.
Figure 6:
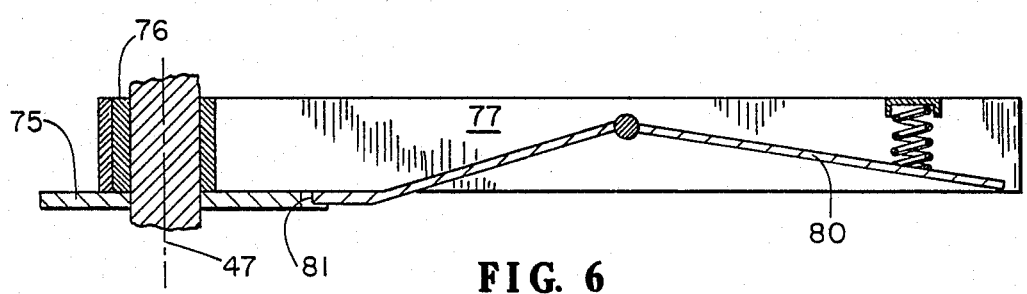
FIG. 6 is a view in cross-section taken along line 6—6 of FIG. 5.

As shown in FIGS. 5 and 6, a plate member 75 is attachable to the top of a valve cover 26. A nut driver 76 is fitted to the flattened end 47 of a valve shaft 25 and contained in an elongated handle 77. Rotation of the handle 77 about the shaft axis 47 rotates the valve element about the shaft axis 47. The plate member 75 has a series of angularly arranged stop notches 78 and a serrated section 79 extending between an angle of 80° and 90° relative to a vertical line on the drawing. In the handle 77 is a spring biased pivotally mounted lever 80 which can be selectively operated to engage the notches 78. On the end of the lever 80 are serrations 81 for engaging the serrated section 79. Lines 82 indicate angular positions of 82°, 86° and 90° which can be aligned with a line 83 on the lever 80. Thus, the operator can selectively position the sealing element in a desired angular position by using the lines 82, 83 for alignment purposes.

Figure 7:
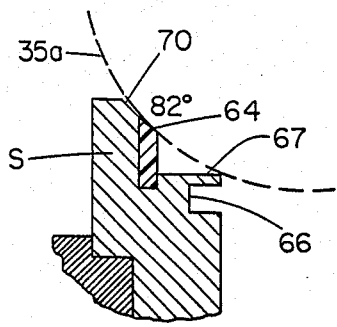
FIGS. 7, 8 and 9 are partial views in cross-section showing relative angular sealing positions at 82°, 86° and 90°.
Figure 8:
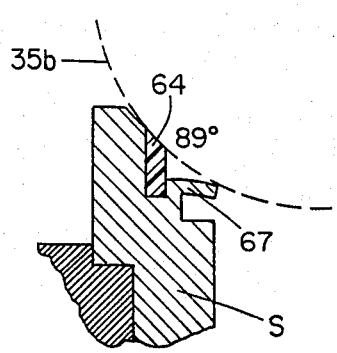
Figure 9:
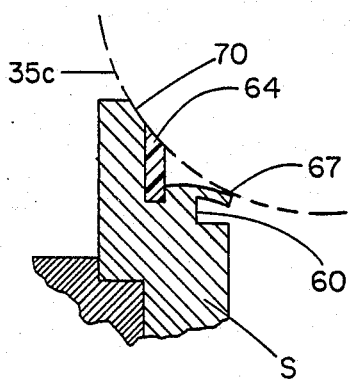

As shown in FIGS. 7-9, the spherical sealing surface 35a at an 82° angular orientation of the valve element engages the teflon seal 64. At 86° angular orientation, the sealing surface 35b (FIG. 8) engages both the teflon seal 66 and the flex-ring seal 67. At a 90° angular rotation, the sealing surface 35c engages the teflon seal 66, the flex-ring seal 67 and the metal-to-metal compression seal 70.

It will be apparent to those skilled in the art that various changes may be made in the invention without departing from the spirit and scope thereof and therefore the invention is not limited by that which is enclosed in the drawings and specifications, but only as indicated in the appended claims.

I claim:

1. A segmented ball valve comprising
a hollow ball valve body member having inlet and outlet bores disposed along a central axis and a hollow interior defining a passageway along said central axis,
means in said body member for journalling upper and lower shaft members along a journal axis transverse to said central axis and offset from said central axis,
valve seat means forming an annular valve seat about said central axis in one of said bores,
valve element means having upper and lower shaft members journalled in said body member for rotation of said valve element means about said journal axis to a 90° position in engagement with said valve seat means for closing said passageway and to a 0° position where said passageway is open, said valve element means including a spherically shaped sealing surface portion which has a spherical configuration with respect to a locus point on the central axis for said passageway in a 90° position of the valve element means, and
said annular valve seat having a generally spherical configuration including an inner annular metal right section, an intermediate non-metal annular contact section and an outer annular metal ring section, said sections being constructed and arranged for selective sealing engagement with said spherically shaped sealing surface on said valve element means during rotation to a 90° position of said valve element means where said intermediate non-metal contact section first provides a pressure seal, said inner metal ring section next provides a metal-to-metal flexure seal, and said outer ring section next provides a metal-to-metal compression seal.

2. The ball valve as defined in claim 1 wherein said spherically shaped sealing surface has an angular dimension with respect to the central axis in a 90° position such that when moving from a 90° position to a 0° position the spherically shaped sealing surface remains equally in contact with both mid-portions of said non-metal contact section of said valve seat in a plane lying on the central axis which is perpendicular to the journal axis until the valve element means opens the passageway.

3. The ball valve as defined in claim 1 wherein the spherically shaped surface on said valve element means is truncated for providing a flat surface at a distance Y from the outer spherically shaped surface according to the relationship of $$Y = 0.007X^2 - 0.02X + 0.170$$

where X equals the diameter of the spherically shaped surface.

4. The ball valve as defined in claim 1 wherein said inner metal ring section is formed by an annular groove in the wall of the valve body member.

5. The ball valve as defined in claim 3 wherein said intermediate non-metal contact section is constructed of teflon.

6. The ball valve as defined in claim 1 wherein said valve element has a flat forward face surface which is perpendicular to the central axis in a 90° position of the valve element means.

7. The ball valve as defined in claim 1 wherein said flexture seal is formed by an annular metal lip portion which is engagable with seal sealing surface at a turning angle about the journal axis of 4° or less than the location of the valve element means at the 90° position.

8. The ball valve as defined in claim 1 wherein said non-metal contact section is engagable with said sealing surface at a turning cycle of 8° or less than the location of the valve element means at the 90° position.

9. The ball valve as defined in claim 1 where in said metal-to-metal compression seal is engagable with said sealing surface at a turning angle of 2° or less than the location of the valve element means at the 90° position.

10. The ball valve as defined in claim 1 wherein said valve element means engages said non-metal contact seal, said flexture seal and said compression seal in sequence while rotating about the journal axis from an angle of 86° to the 90° position of the valve element means.

11. The ball valve as defined in claim 10 and including turning means attached to said valve element means and locking means for selectively locking said turning means and said valve element means at a selected angular position.

* * * * *